US012236684B2

(12) United States Patent
Park et al.

(10) Patent No.: US 12,236,684 B2
(45) Date of Patent: Feb. 25, 2025

(54) OCCUPANCY CONTROL APPARATUS

(71) Applicant: ITX-AI Co., Ltd., Seoul (KR)

(72) Inventors: Dong Uk Park, Gwangmyeong-si (KR); Byung Yun Lee, Seongnam-si (KR)

(73) Assignee: ITX-AI Co., Ltd., Seoul (KR)

(*) Notice: Subject to any disclaimer, the term of this patent is extended or adjusted under 35 U.S.C. 154(b) by 282 days.

(21) Appl. No.: 17/326,362

(22) Filed: May 21, 2021

(65) Prior Publication Data

US 2021/0374426 A1 Dec. 2, 2021

(30) Foreign Application Priority Data

May 29, 2020 (KR) .................. 10-2020-0065271

(51) Int. Cl.
*G06V 20/52* (2022.01)
*G06T 7/70* (2017.01)
(Continued)

(52) U.S. Cl.
CPC .............. *G06V 20/52* (2022.01); *G06T 7/70* (2017.01); *G07C 9/10* (2020.01); *G07C 9/37* (2020.01);
(Continued)

(58) Field of Classification Search
CPC .... G06V 20/52; G06V 40/161; G06V 40/172; G06T 7/70; G06T 2207/30196;
(Continued)

(56) References Cited

U.S. PATENT DOCUMENTS 6,696,945 B1* 2/2004 Venetianer ............. G06V 20/53
340/541
2002/0145505 A1* 10/2002 Sata ......................... G07C 9/10
340/541
(Continued)

FOREIGN PATENT DOCUMENTS

JP 08-273016 A 10/1996
KR 10-2008-0085106 A 9/2008
KR 10-2017-0001083 A 1/2017

OTHER PUBLICATIONS

Korean Office Action mailed Nov. 29, 2021 for Korean Application No. 10-2020-0065271.

*Primary Examiner* — Qian Yang
(74) *Attorney, Agent, or Firm* — Insight Law Group, PLLC; Seung Lee

(57) ABSTRACT

A technique for counting the number of occupants is provided. An occupancy control apparatus may be part of an access control apparatus or a security system for identifying visitors. The number of occupants is calculated from the difference between a count of people entering a space and a count of people exiting the space, and entering the space is restricted when the difference is greater than a reference value. A current counter value may be corrected in real time by counting a fractional error rate per count of each counter. An entrance may be blocked when the number of occupants is greater than the reference value, and the blocking of the entrance may be released when the number of occupants is restored to another reference value or less. An error rate per count of each counter may be calculated in units of devices or time slots.

15 Claims, 5 Drawing Sheets

(51) Int. Cl.
*G07C 9/10* (2020.01)
*G07C 9/37* (2020.01)

(52) U.S. Cl.
CPC ............... *G06T 2207/30196* (2013.01); *G06T 2207/30242* (2013.01); *G07C 2209/08* (2013.01)

(58) Field of Classification Search
CPC . G06T 2207/30242; G06T 7/292; G07C 9/10; G07C 9/37; G07C 2209/08; G07C 9/30; Y02B 20/40
See application file for complete search history.

(56) References Cited

U.S. PATENT DOCUMENTS

| | | |
|---|---|---|
| 2006/0067456 A1 | 3/2006 | Ku et al. |
| 2019/0236376 A1* | 8/2019 | Sakashita ................. G07C 9/22 |
| 2021/0287469 A1* | 9/2021 | Ryhorchuk .......... G06V 40/172 |

* cited by examiner

OCCUPANCY CONTROL APPARATUS

CROSS-REFERENCE TO RELATED APPLICATION(S)

This application claims priority from Korean Patent Application No. 10-2020-0065271, filed on May 29, 2020, in the Korean Intellectual Property Office, the disclosure of which is incorporated herein by reference in its entirety.

BACKGROUND

1. Field

A technique for counting the number of occupants is provided. An occupancy control apparatus may be part of an access control apparatus or a security system for identifying visitors.

2. Description of Related Art

A technique for counting visitors to control illumination or an indoor environment has been known. With the development of artificial intelligence techniques, visitors can be identified and counted using a camera in a very reliable manner. The inventors of the present application who work in the field of security have proposed a technique for effectively controlling the number of occupants because of concerns about the spread of infectious diseases.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description is directed to providing an automated technique for efficiently controlling the number of occupants.

The following description is also directed to accurately counting the number of occupants.

In a general aspect, the number of occupants is calculated from the difference between a count of people entering a space and a count of people exiting the space, and entering the space is restricted when the number of occupants is greater than a reference value.

In another general aspect, a current count may be corrected in real time by counting a fractional error rate per count of each counter.

In another general aspect, an entrance may be blocked when the number of occupants exceeds a reference value.

In another general aspect, when the number of occupants is recovered to another reference value or less, the blocking of the entrance may be released.

In another general aspect, an error rate per count of a counter may be calculated in units of devices or time slots.

In another general aspect, a counter may be implemented as program instructions for detecting and counting human objects in an image from a camera.

In another general aspect, an entrance and an exit may be spaces that at least partially overlap each other, and an entering-people counter and an exiting-people counter may receive and process an image from the same camera.

In another general aspect, a counter may count human objects by identifying and tracking human objects through a human detector and tracker and counting objects passing through a virtual trip wire in a corresponding direction.

In another general aspect, a person who attempts to enter a space may be identified through a camera while an entrance is blocked, and the blocking of the entrance may be released to allow the person's entry into the space when the person is a registered person.

In another general aspect, blocking of an entrance of a space is released according to a result of reading a waiting number ticket while the entrance is blocked, thereby selectively allowing entry into the space.

Other features and aspects will be apparent from the following detailed description, the drawings, and the claims.

Figure 1:
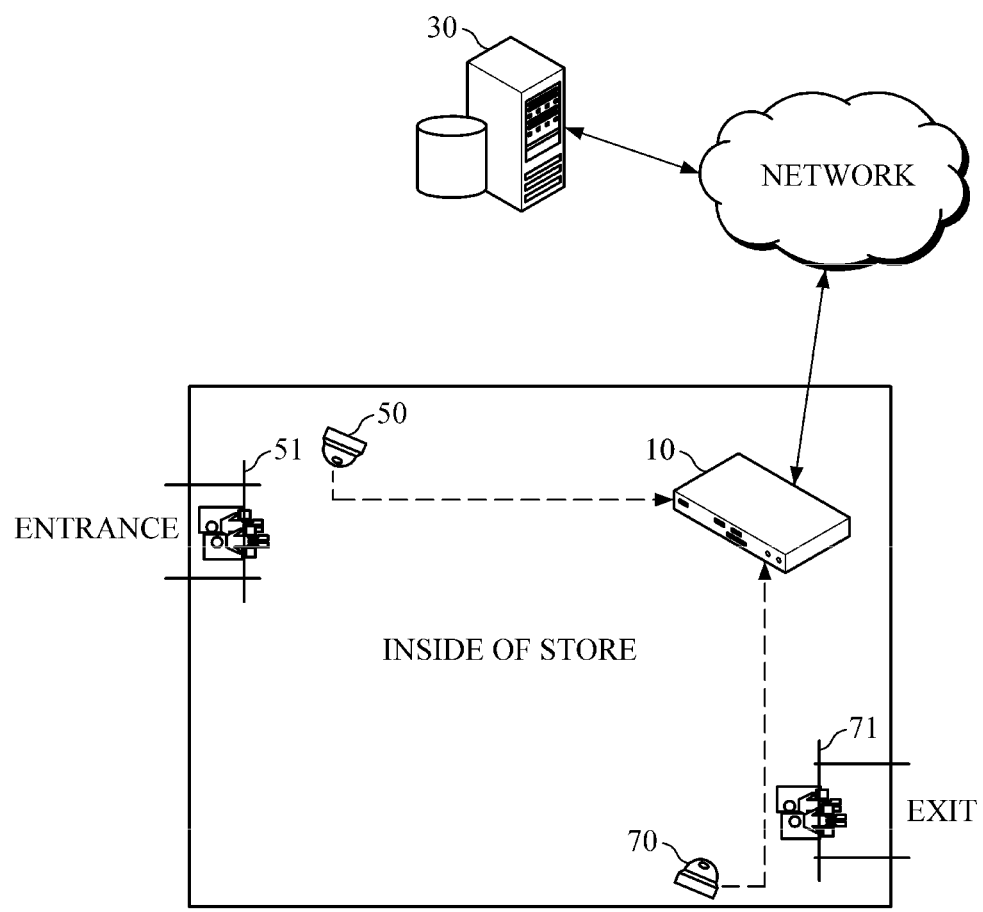
FIG. 1 illustrates a configuration of an example of an occupancy control system to which the following description is applied.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The foregoing and further aspects will be implemented through embodiments described with reference to the accompanying drawings below. It should be understood that components of each embodiment can be implemented in various combinations therein or with those of other embodiments, unless mentioned otherwise and as long as there is no contradiction between components. The terms used in the present specification and the claims should be interpreted as meanings and concepts in accordance with the description herein or the proposed technical idea based on the principle that the inventors can appropriately define the concept of the terms to describe the invention in the best way. Hereinafter, embodiments of the present disclosure will be described in detail with reference to the accompanying drawings.

FIG. 1 illustrates a configuration of an example of an occupancy control system to which the following description is applied. In the illustrated example, an occupancy control apparatus is installed inside a store. A space in which the occupancy control apparatus is installable may include not only the store but also an office, a public building, or a controlled outdoor space. In the illustrated example, an entering-people counter 50 and an exiting-people counter 70 are implemented as dome-type cameras installed on a ceiling of the store and software. An entrance and an exit may be provided at a boundary of a space-of-interest in which people entering the store and people exiting the store are counted but may be located outside apart from the boundary. In this case, cameras may be installed outside apart from the boundary of the space-of-interest. The cameras may be dome type cameras but may be security cameras, general cameras, stereo cameras, or special cameras such as thermal imaging cameras. The software for counting people entering the store and people exiting the store may be installed and executed in the cameras, a control terminal 10 connected to the cameras, or a server 30 to which the control terminal 10 is connected. A plurality of entering-people counters 50 and a plurality of exiting-people counters 70 may be provided with respect to entrances and exits of one space. In the illustrated example, the entrance and the exit are separated from the store but are not limited thereto and may be spaces spatially partially or entirely overlapping each other. That is, the entrance and the exit may be arranged on the same front door to be adjacent to each other, and both entering the store and exiting the store through one entrance may be permitted. In this case, the same camera or a plurality of cameras may be used as the entering-people counter 50 and the exiting-people counter 70, and software for counting people entering the store space by processing images received from the same camera or the plurality of cameras and software for counting people exiting the store by processing the images may be provided or the same software may be individually implemented as a task or a process by changing a configuration thereof.

A camera serving as the entering-people counter 50 identifies and counts people, e.g., faces of people, passing an entrance counting line 51. A camera serving as the exiting-people counter 70 identifies and counts people, e.g., faces of people, passing an exit counting line 71. However, the present disclosure is not limited thereto and an artificial intelligence engine trained to identify human objects may be used. Human objects may be identified and tracked to determine whether the human objects are entering or exiting the store on the basis of moving paths thereof.

Figure 2:
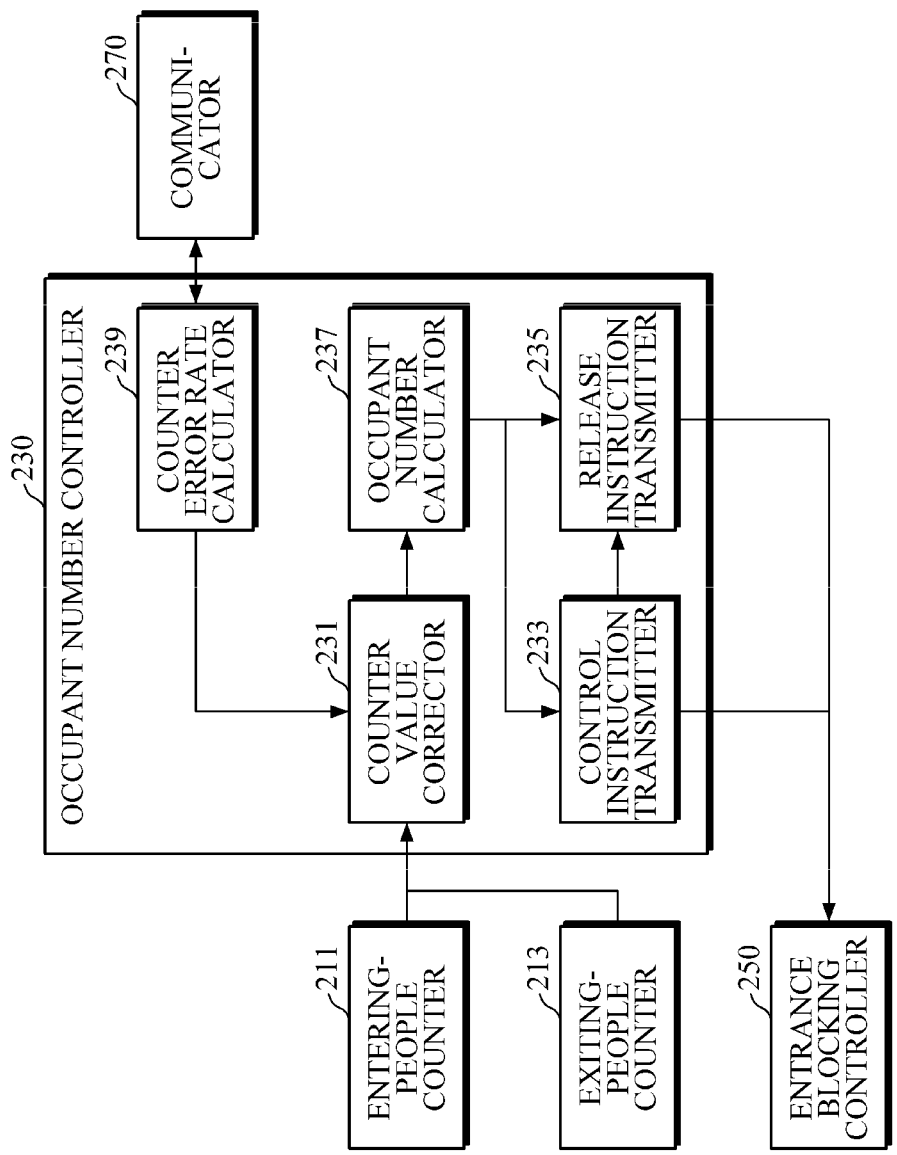
FIG. 2 is a block diagram illustrating a configuration of an example of an occupancy control apparatus.

FIG. 2 is a block diagram illustrating a configuration of an example of an occupancy control apparatus. As shown in FIG. 2, the example of the occupancy control apparatus includes an entering-people counter 211, an exiting-people counter 213, and an occupant number controller 230. The entering-people counter 211 is installed at an entrance to count people entering a space. The entering-people counter 211 is embodied as a camera as illustrated in FIG. 1. In the illustrated example, the camera is a security camera and identifies and counts faces of people passing the entrance counting line 51. However, the present disclosure is not limited thereto, and a simple optical counter or a human body detection sensor that counts only humans may be employed.

The exiting-people counter 213 is installed at an exit to count people exiting the space. As illustrated in FIG. 1, in the illustrated example, the exiting-people counter 213 is embodied as a camera. In the illustrated example, the camera is a security camera and identifies and counts faces of people passing the exit counting line 71. However, the present disclosure is not limited thereto, and a simple optical counter or a human body detection sensor that counts only human may be employed.

With the advancement of artificial intelligence technology, technology for extracting face regions of passersby and recognizing faces in the extracted face regions can be implemented with high reliability. A system administrator may select and set up an algorithm appropriate for a corresponding space or a place in which cameras are installed from among a plurality of well-known face region extraction algorithms and face recognition algorithms.

The occupant number controller 230 may be implemented as computer program instructions in a set-top terminal device such as the control terminal 10 of FIG. 1. Each block included in the occupant number controller 230 illustrated in FIG. 2 may be implemented as a set of computer program instructions for performing a corresponding function. However, all or some of the blocks may be implemented inside a camera or a server connected to the camera or the control terminal 10.

According to an embodiment, the occupant number controller 230 includes an occupant number calculator 237 and a control instruction transmitter 233. The occupant number calculator 237 calculates the number of occupants from the difference between a count of the entering-people counter 211 and a counter of the exiting-people counter 213. A value obtained by subtracting a current count of the exiting-people counter 213 from a current count of the entering-people counter 211 may be considered as a current number of occupants. The control instruction transmitter 233 compares the calculated number of occupants with a first reference value and transmits an entry control instruction when the calculated number of occupants is greater than or equal to the first reference value. The first reference value may be determined by reflecting a space or appropriate activity space in which the capacity thereof or the distances between people entering the space is reflected. The entry control instruction may be transmitted and displayed to an entry control space so as to be checked by guards who perform access control.

According to an additional embodiment, the occupant number controller 230 may further include a counter value corrector 231. The counter value corrector 231 corrects an output value of each of the entering-people counter 211 and the exiting-people counter 213 by reflecting a fractional error rate per count thereof. For example, the error rate per count of each of the entering-people counter 211 and the exiting-people counter 213 may be measured using a high-precision measurement system for counting people entering a space and people exiting the space. The high-precision measurement system may be implemented, for example, with two or three cameras installed at different angles. When a plurality of spatially synchronized images captured by a plurality of cameras are used, the reliability of counting may be increased but costs may increase. An error of a counter may be calculated by comparing a value measured by a removable high-precision measurement system, which is configured to count people entering a space and people exiting the space, installed at a corresponding entrance with a value measured by the entering-people counter 211 installed at the corresponding entrance. An error of a counter may vary according to a place, weather, and a day of the week.

Furthermore, the error of the counter may be predicted according to the number of crowded people identified by a camera and an arrangement of people around the camera. An error of a counter according to an arrangement of visitors may be predicted by learning accumulated data using an entering-people counter or exiting-people counter installed together with the high-precision measurement system. The error of the counter may be divided by a number of times of counting to calculate a counting error probability or a positive or negative fractional error per count. Each time a count of each of the entering-people counter 211 and the exiting-people counter 213 changes, the error per count may be added thereto to calculate a count correction value in which an error is reflected in real time. An error per count of a counter may be updated or received from a server through a communicator 270.

According to an additional embodiment, the occupant number controller 230 may further include a counter error rate calculator 239. The counter error rate calculator 239 calculates a fractional error rate per count of each of the entering-people counter 211 and the exiting-people counter 213 from the number of occupants calculated for a reference time.

In the case of a shopping mall, the number of occupants is zero a certain time after a closing time of each store. In the case of a building space, the number of people who stay late at night is known. As described above, accumulated errors of the number of occupants may be identified by setting a reference time when the number of occupants is fixed according to a space. At the reference time, the counter error rate calculator 239 receives current counts of the entering-people counter 211 and the exiting-people counter 213, identifies the number of occupants, and instructs to reset the entering-people counter 211 and the exiting-people counter 213.

When visitors are counted using a camera, counting of visitors whose faces are hidden is likely to be omitted but there are few cases in which a result of counting is higher than an actual number of visitors. A miscount of the entering-people counter 211 and a miscount of the exiting-people counter 213 are accumulated and reflected into the number of occupants for the reference time. A count error of the entering-people counter 211 and a count error of the exiting-people counter 213 may be calculated by respectively dividing count errors, which are accumulated to reflect characteristics of a store, by a miscount rate of the entering-people counter 211 and a miscount rate of the exiting-people counter 213. An error of a counter may be divided by a number of times of counting to calculate a counting error probability or a positive or negative fractional error per count. Each time a count of each of the entering-people counter 211 and the exiting-people counter 213 changes, the error per count may be added thereto to calculate a count correction value in which an error is reflected in real time.

For example, in the case of a store, the miscount of the exiting-people counter 213 is filtered out and thus a count error of the exiting-people counter 213 is far less than that of the entering-people counter 211. The ratio between the miscount of the entering-people counter 211 and the miscount of the exiting-people counter 213 count errors may be empirically set by an administrator with experience operating the system.

In another embodiment, an error rate per count of a counter may be calculated in units of devices or time slots. A ratio between a count error of the entering-people counter 211 and a count error of the exiting-people counter 213 may vary according to a place in which these counters are installed or time slots. Thus, an error rate per count of a counter may be calculated according to a place in which the counter is installed or time slots.

In another embodiment, when the number of occupants exceeds a reference value, an entrance may be blocked. The occupancy control apparatus may further include an entrance blocking controller 250. When receiving a control instruction from the number of occupants warning unit, the entrance blocking controller 250 may block the entrance. For example, the entrance blocking controller 250 may be a driver for driving a barrier installed at the entrance.

In another embodiment, when the number of occupants is recovered to another reference value or less, the blocking of the entrance may be released. The occupancy control apparatus may further include a release instruction transmitter 235. The release instruction transmitter 235 compares a calculated number of occupants with a second reference value and transmits a control release instruction to the entrance blocking controller 250 when the calculated number of occupants is less than or equal to the second reference value. The second reference value may be the same value as the first reference value or may be set to be less by a certain level than the first reference value in consideration of convenience or error of access control.

Figure 3:
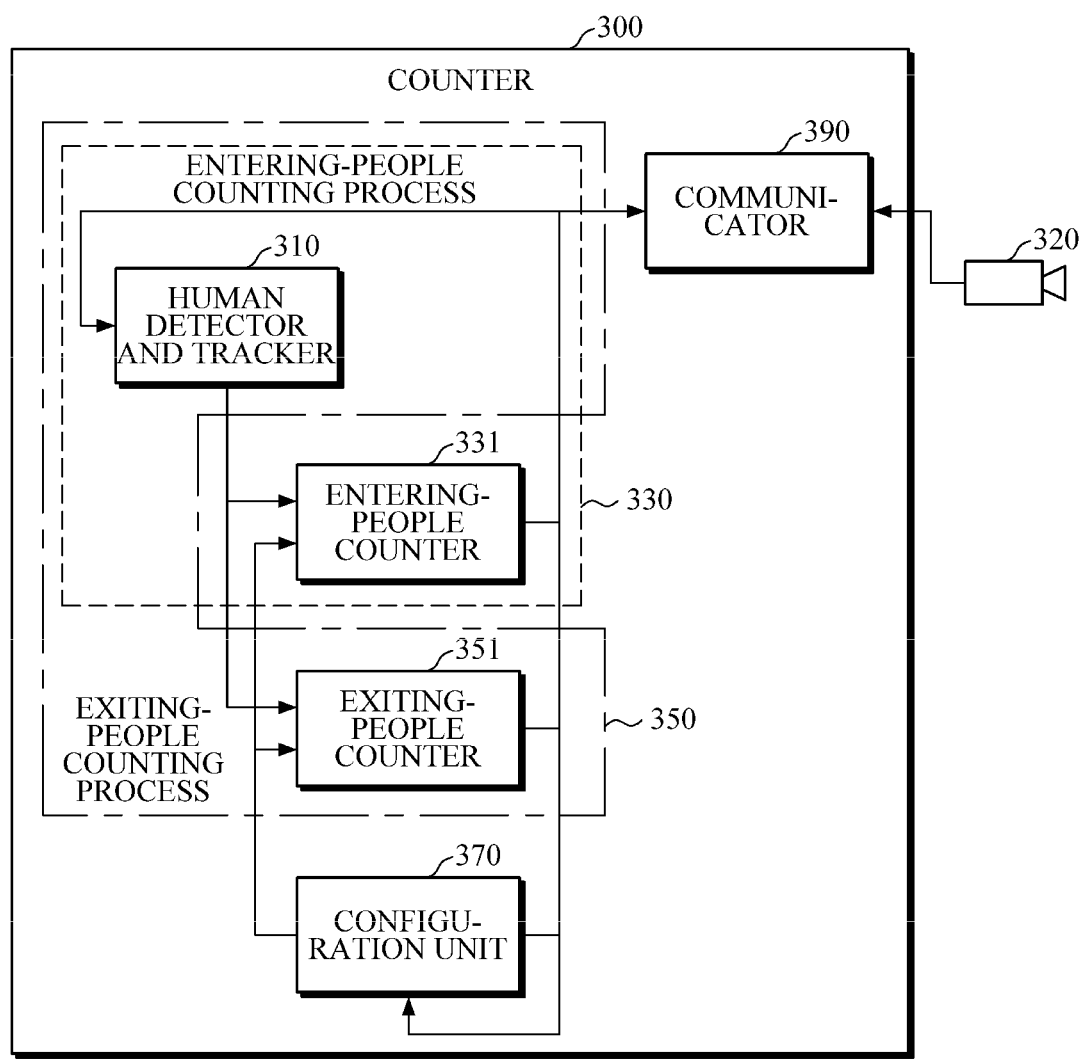
FIG. 3 is a block diagram illustrating a configuration of an example of an entering-people counter or an exiting-people counter.

According to another embodiment, a counter may be implemented as program instructions configured to be executed by a computing element, to detect and count human objects in an image from a camera. Examples of the computing element may include a single microprocessor or one or more processors such as a general-purpose microprocessor with an artificial-intelligence-dedicated processor, and a circuit that is subjected thereto. For example, a counter 300 may be implemented together with a processor or a computing element, which is embodied as the occupant number controller 230 in FIG. 2. FIG. 3 is a block diagram illustrating a configuration of an example of an entering-people counter or exiting-people counter. As shown in FIG. 3, an example of the counter 300 receives an image output from a camera 320 and detects and counts objects in the image.

According to an embodiment, an entering-people counter may be implemented to include the camera 320 and an entering-people counting process 330. The camera 320 may be connected to the counter 300 through a network. The entering-people counting process 330 may be implemented as program instructions executable by a computing element and may receive an image output from the camera 320 and detect and count objects in the image.

Similarly, an exiting-people counter may be implemented to include the camera 320 and an exiting-people counting process 350. The camera 320 may be connected to the counter 300 through a network. The exiting-people counting process 350 may be implemented as program instructions executable by a computing element, and an image output from the camera 320 may be received and objects in the image may be detected and counted.

As described above, when spaces of an entrance and an exit overlap in the above example, an entering-people counter and an exiting-people counter process an image output from the same camera.

In an embodiment, some program instructions for implementing an entering-people counting process and an exiting-people counting process may use the same program instructions in common. In the illustrated example, the entering-people counting process and the exiting-people counting process share a human detector and tracker. However, the present disclosure is not limited thereto, and different cameras should be used and thus different human detector and trackers should be provided when an entering-people counter and an exiting-people counter are installed in different spaces but different human detector and trackers may be used even when an entering-people counter and exiting-people counter are not installed in different spaces. The entering-people counting process and the exiting-people counting process perform similar image processing operations and thus may use the same program. The human detector and tracker is a technique for detecting human objects in a video and tracking movements thereof and is well-known and developed in the field of artificial intelligence, and thus, a detailed description is omitted here.

In an additional embodiment, in a counting process, human objects are identified and tracked through the human detector and tracker and objects passing through a virtual trip wire are counted. In the additional embodiment, in the entering-people counting process, an output of the human detector and tracker 310 is received and objects passing through a configured virtual trip wire in an entrance direction are counted. Virtual trip wire technology is a well-known technology in the field of security disclosed in U.S. Pat. No. 6,696,945, which has recently been invalidated. For example, the entrance counting line 51 of FIG. 1, which is set at the entrance, may be set as a virtual trip wire. In an embodiment, the human detector and tracker 310 outputs center coordinates of each of detected human objects. An entering-people counter 331 determines whether a corresponding object passes the entrance counting line 51, which is the virtual trip wire, in the entrance direction. A technique for converting an image coordinate system into a ground coordinate system to determine whether an object is entering a space is known as homography. Thus, a virtual trip wire boundary set in the image coordinate system may be converted into a boundary in the ground coordinate system, coordinates of an object output from the image coordinate system may be converted into coordinates of the object in the ground coordinate system, and whether an object passes the boundary expressed with a segment may be determined. As another example, a region may be set and objects entering or approaching the region may be counted. Security technology performed by setting a region having a figure shape is also well-known in this field.

In FIG. 3, a configuration unit 370 sets parameters or an environment related to a function of the counter 300. A user may access the counter 300 and set related information through a terminal such as a smartphone or a computer. For example, the user may set a virtual trip wire of the entering-people counter 331 and a virtual trip wire of an exiting-people counter 351 on a screen of a camera. A configuration of the exiting-people counting process 350 corresponds to that of the entering-people counting process 330 and thus a detailed description thereof is omitted here.

Figure 4:
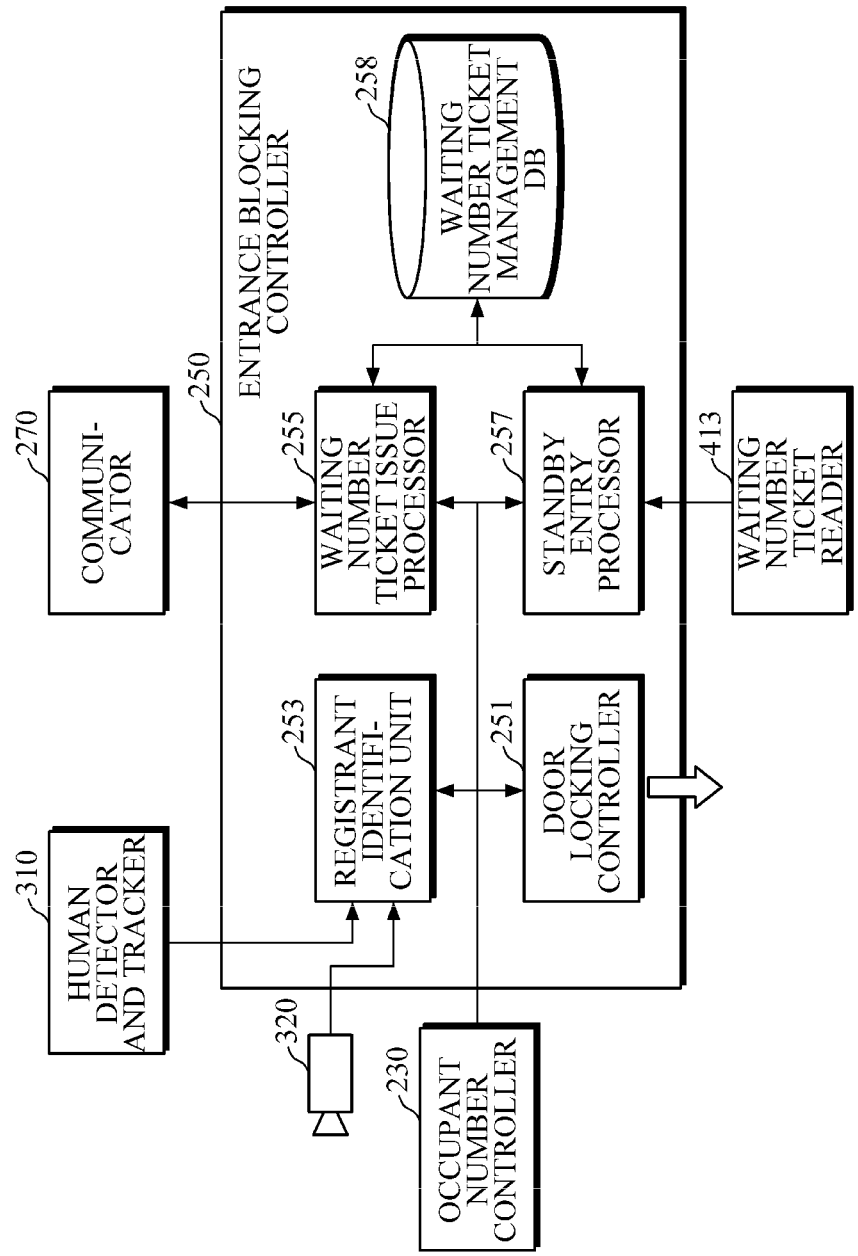
FIG. 4 is a block diagram illustrating a configuration of an example of an entrance blocking controller of FIG. 2.
Figure 5:
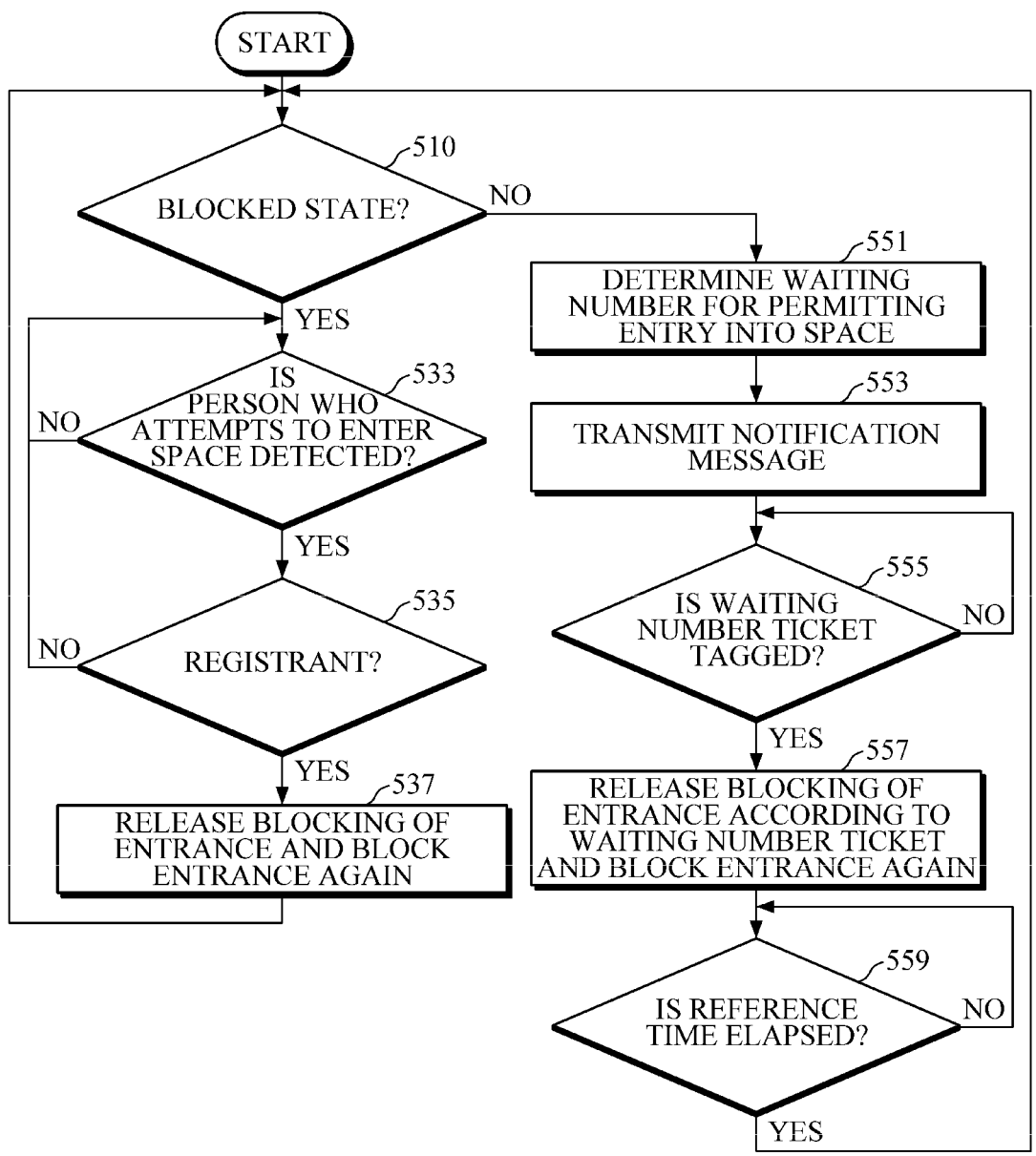
FIG. 5 is a flowchart of an example of a control method of an entrance blocking controller.

FIG. 4 is a block diagram illustrating a configuration of an example of the entrance blocking controller 250 of FIG. 2. Components of FIG. 4 that are similar or correspond to those of FIG. 2 are assigned the same reference numerals. FIG. 5 is a flowchart of an example of a control method of the entrance blocking controller 250. As illustrated in FIG. 4, an example of the entrance blocking controller 250 includes a door locking controller 251. The door locking controller 251 blocks an entrance when receiving an entrance blocking instruction from the occupant number controller 230 and releases the blocking of the entrance when receiving an entrance blocking releasing instruction from the occupant number controller 230. A blocking/release state of the entrance may be managed using a status flag within the entrance blocking controller 250. In an embodiment, the entrance blocking controller 250 may further include a registrant identification unit 253. The registrant identification unit 253 may identify a person, who attempts to enter a space, through a camera while an entrance is blocked and may release the blocking of the entrance to allow the person's entry into the space when the person is a registered person. For example, the door locking controller 251 may be connected to a door lock by wire. As another example, the door locking controller 251 may control the door lock through the communicator 2700.

Referring to FIG. 5, the registrant identification unit 253 may be implemented as a task or process that is performed independently. First, the registrant identification unit 253 checks whether a status flag indicates a blocked state (operation 510). When the status flag indicates the blocked state, trajectory information of a human object output from the human detector and tracker 310 is analyzed to detect a human object that attempts to enter a space. When a human object that attempts to enter the space is detected, a face of the human object is identified by capturing at least one image frame of an image input from the camera 320. When the human object is a registered person (operation 535), blocking of the entrance is temporarily released so that the person may enter the space (operation 537).

An example of the entrance blocking controller 250 may further include a waiting number ticket issue processor 255. The waiting number ticket issue processor 255 receives a cellular phone number through, for example, a tablet and issues a waiting number ticket. The waiting number ticket may include a sequence number and may be represented, for example, as a quick-response (QR) code.

In an embodiment, the entrance blocking controller 250 may further include a standby entry processor 257. The standby entry processor 257 may release the blocking of the entrance according to a result of reading the waiting number ticket while the entrance is blocked, thereby selectively allowing entry into the space. As another example, the waiting number ticket issue processor 255 and/or the standby entry processor 257 may be controlled by a system separated from the entrance blocking controller 250, e.g., a separate server or system connected to the entrance blocking controller 250 through a network. For example, the waiting number ticket issue processor 255 or the standby entry processor 257 may be implemented as a cloud service server that provides services to a plurality of entrance blocking controllers 250.

Referring to FIG. 5, the standby entry processor 257 may be implemented as a task or process that is executed independently. First, the standby entry processor 257 checks whether a status flag indicates a blocked state (operation 510). When the status flag indicates a released state other than the blocked state, the difference between the number of occupants output from the occupant number controller 230 and the number of people to be accommodated, i.e., a maximum number of permitted people, is calculated to determine a waiting number for permitting entry into a space (operation 551). Thereafter, contact information of a person corresponding to the waiting number is extracted from a waiting number ticket management database 258 and a notification message is transmitted to the person (operation 553).

Thereafter, whether a waiting number ticket is detected by a waiting number ticket reader 413 is checked (operation 555). When a waiting number ticket reading event occurs, the standby entry processor 257 checks whether a waiting number read from a waiting number ticket, which is in the form of QR code, is the waiting number which allows entry into the space, and the blocking of the entrance is blocked or maintained according to the result (operation 557). When a certain reference time elapses after the transmission of the alarm message to the person corresponding to the waiting number ticket, the performance of a period of process is ended (operation 559).

It is difficult to maintain the distance between people when the number of occupants exceeds a certain number. In accordance with the following description, it is possible to provide efficient and automated control of the number of occupants. Furthermore, because a count of each counter is corrected, an error can be fixed in real time, thereby maintaining an accurate number of occupants.

While the present disclosure has been described above with respect to embodiments in conjunction with the accompanying drawings, the present disclosure is not limited thereto and should be interpreted to cover various modifications that will be apparent to those of ordinary skill in the art. The claims are intended to cover such modifications.

What is claimed is:

1. An occupancy control apparatus comprising:
an entering-people counter comprising a first camera;
an exiting-people counter comprising a second camera; and
an occupant number controller comprising:
an occupant number calculator configured to calculate the number of occupants from a difference between a count of the entering-people counter and a count of the exiting-people counter;
a counter error rate calculator configured to calculate a miscount rate per count of each of the entering-people counter and the exiting-people counter from the number of occupants calculated for a reference time;
a counter value corrector configured to correct the count of the entering-people counter and the count of the exiting-people counter by respectively dividing count errors by the miscount rate per count of the entering-people counter and the miscount rate per count of the exiting-people counter to generate a corrected number of occupants;
a control instruction transmitter configured to compare the corrected number of occupants with a first reference value and transmit an occupancy control instruction when the corrected number of occupants is greater than or equal to the first reference value; and
an entrance blocking controller configured to block an entrance when the occupancy control instruction is received from the control instruction transmitter, wherein the entrance blocking controller comprises a registrant identification unit configured to identify a person, who attempts to enter the entrance, through the first camera in a state in which the entrance is blocked due to the corrected number of occupants being greater than or equal to the first reference value and release the blocking of the entrance and allow the person to enter the entrance when the person is a registered person.

2. The occupancy control apparatus of claim 1, wherein the first camera is a security camera and identifies and counts faces of people passing an entrance counting line, and
wherein the second camera is a security camera and identifies and counts faces of people passing an exit counting line.

3. The occupancy control apparatus of claim 1, wherein the counter error rate calculator receives current counts of the entering-people counter and the exiting-people counter at the reference time when the number of occupants is fixed according to a space, identifies the number of occupants, and resets the entering-people counter and the exiting-people counter.

4. The occupancy control apparatus of claim 1, wherein the counter error rate calculator calculates an error rate per count of each of counters in units of places in which the counters are installed and in units of time slots.

5. The occupancy control apparatus of claim 1, wherein the occupant number controller further comprises a release instruction transmitter configured to compare the corrected number of occupants with a second reference value and transmit a control release instruction to the entrance blocking controller when the corrected number of occupants is less than or equal to the second reference value.

6. The occupancy control apparatus of claim 1, wherein the entering-people counter is implemented as a first camera and program instructions executed by a computing element, and comprises a first counting process of receiving an image output from the first camera and detecting and counting objects, and
the exiting-people counter is implemented as a second camera and program instructions executed by the computing element, and comprises a second counting process of receiving an image output from the second camera and detecting and counting human objects.

7. The occupancy control apparatus of claim 6, wherein the first camera and the second camera are the same camera.

8. The occupancy control apparatus of claim 6, wherein, in the first counting process and the second counting process, human objects are identified and tracked through a human detector and tracker, and objects passing through a virtual trip wire in a corresponding direction are counted.

9. The occupancy control apparatus of claim 1, wherein the entrance blocking controller comprises a standby entry processor configured to release the blocking of the entrance according to a result of reading a waiting number ticket and selectively allowing entry into a space in a state in which the blocking of the entrance is released.

10. The occupancy control apparatus of claim 1, further comprising an artificial intelligence engine which is trained to identify human objects, wherein the human objects are identified and tracked to determine whether the human objects are entering or exiting on the basis of moving paths thereof.

11. The occupancy control apparatus of claim 1, further comprising:
an additional measurement system with two or more cameras installed at different angles to increase reliability of counting.

12. An occupancy control method, comprising:
calculating a number of occupants from a difference between a count of an entering-people counter and a count of an exiting-people counter;
calculating a miscount rate per count of each of the entering-people counter and the exiting-people counter from the number of occupants calculated for a reference time;
correcting the count of the entering-people counter and the count of the exiting-people counter by respectively dividing count errors by the miscount rate per count of the entering-people counter and the miscount rate per count of the exiting-people counter to generate a corrected number of occupants;
comparing the corrected number of occupants with a first reference value and transmitting an entry control instruction when the corrected number of occupants is greater than or equal to the first reference value;
blocking an entrance when the entry control instruction is received; and
identifying a person who attempts to enter an entrance through a camera in a state in which the entrance is blocked due to the corrected number of occupants being greater than or equal to the first reference value, and releasing the blocking of the entrance and allowing the person to enter a space when the person is a registered person.

13. The occupancy control method of claim 12, further comprising: comparing the corrected number of occupants with a second reference value and transmitting a control release instruction when the corrected number of occupants is less than or equal to the second reference value.

14. The occupancy control method of claim 12, further comprising:
- calculating the count of the entering-people counter by identifying and tracking human objects in an image from a first camera and counting objects passing through a virtual trip wire in an entry direction; and
- calculating the count of the exiting-people counter by identifying and tracking human objects in an image from a second camera and counting objects passing through the virtual trip wire in an exit direction.

15. The occupancy control method of claim 12, further comprising:
- releasing blocking of an entrance according to a result of reading a waiting number ticket and selectively allowing entry into a space in a state in which the blocking of the entrance is released.

* * * * *